United States Patent [19]
Stein

[11] Patent Number: 5,970,712
[45] Date of Patent: Oct. 26, 1999

[54] COMBINED MATERIAL CONVEYOR AND ELECTRICAL POWER GENERATING SYSTEM

[76] Inventor: Allan Patrick Stein, 36 Edgeland Close, Calgary, Alberta, Canada, T3A 3B1

[21] Appl. No.: 08/958,990

[22] Filed: Oct. 28, 1997

Related U.S. Application Data

[63] Continuation of application No. 08/567,360, Dec. 4, 1995, abandoned.

[51] Int. Cl.$^6$ .......................................................... F03B 7/00
[52] U.S. Cl. ............................................. 60/639; 290/1 R
[58] Field of Search ................................. 60/639; 290/1 R

[56] References Cited

U.S. PATENT DOCUMENTS 3,713,521 1/1973 Moritake .
3,985,222 10/1976 Kressly ..................................... 198/617
3,987,307 10/1976 Giconi .

OTHER PUBLICATIONS

Holter, James T; *Downhill Conveying;* Pit & Quarry Magazine, Oct., 1995, pp. 44–45.

*Primary Examiner*—Noah P. Kamen
*Attorney, Agent, or Firm*—Sean W. Goodwin

[57] ABSTRACT

A combined material conveyor and electrical generation system is disclosed. The invention may be used to provide electrical energy to a remote location through which the material conveyor passes and/or harness energy which would normally be dissipated in braking a material conveyor. One or more electrical generators is driven by the motion of a belt in a material conveyor. Electrical power generated by the generator is delivered to an external power output. The invention can capture the potential energy of particulate matter which is transported on a material conveyor, particularly through a net elevation drop. Electricity produced may be used immediately or stored in a battery system for future use.

5 Claims, 9 Drawing Sheets

COMBINED MATERIAL CONVEYOR AND ELECTRICAL POWER GENERATING SYSTEM

This application is a continuation of U.S. patent application Ser. No. 08/567,360, filed Dec. 4, 1995, and entitled COMBINED MATERIAL CONVEYOR AND ELECTRICAL POWER GENERATING SYSTEM, now abandoned.

FIELD OF THE INVENTION

This invention relates to material conveyors. The invention has particular application to the long material conveyors used to move mining products. This invention also relates to a system for generating electrical power.

BACKGROUND OF THE INVENTION

High volume conveyor systems are used in mines to move crushed mining products such as crushed rock, minerals, coal and/or ores. Such conveyor systems typically have a wide material-carrying conveyor belt supported by a large number of rollers spaced apart along the length of the conveyor system. The conveyor system may extend for as much as several miles. If the conveyor system extends down a slope the conveyor belt may be driven by the weight of material piled on the top surface of the conveyor belt. The conveyor belt may also be driven by a motor coupled either to one or more of the rollers supporting the conveyor belt or to the conveyor belt itself, particularly where the conveyor system does not extend down a slope.

In a conveyor system which descends down a slope the material on the conveyor belt exerts a force on the conveyor belt which tends to accelerate the conveyor belt. In a typical conveyor system, brakes must be provided to prevent the conveyor belt from running too quickly. To prevent excessive acceleration of the conveyor belt, the brakes and friction present in the conveyor system must dissipate an amount of energy proportional to the change in potential energy of the material being moved by the conveyor system. The potential energy of the many tons of rock at the top of the conveyor system can be substantial.

Moritake, U.S. Pat. No. 3,713,521 discloses a braking system for a roller in a beltless conveyor. The braking system comprises an electrical generator and brake inside a conveyor roller. Electricity generated by the generator activates an electromagnetic brake inside the roller. All of the electrical power generated by Moritake's generator is used to operate the electromagnetic brake or is dissipated in a variable resistor which may be used to vary the braking force.

Giconi, U.S. Pat. No. 3,987,307, discloses a system for generating electrical energy by dropping particulate material down a shaft and directing the falling particulate matter into buckets around the periphery of a large wheel, similar to a "water wheel". The wheel turns as a result of the transference of kinetic energy from the falling particulate matter to the wheel and the unbalanced weight of particulate matter on the wheel. The hub of the wheel is coupled to an electrical generator.

SUMMARY OF THE INVENTION

This invention provides apparatus for generating electrical energy from the motion of a conveyor belt in a material conveyor. The invention may be used to provide electrical energy to a remote location through which the conveyor passes and/or harness energy which would normally be dissipated in braking a material conveyor. Accordingly, the invention provides a combined material conveyor and electrical power generating system comprising an elongated conveyor belt having an input end and an output end, at least one electrical power generator driven directly or indirectly by motion of the conveyor belt, and electrical conductors extending from the power generator to a power outlet for providing electrical power to electrical devices external to the material conveyor. The conveyor belt is supported along its length by a plurality of spaced apart transverse rollers. Preferably several electrical generators are driven by the conveyor belt.

A preferred embodiment of the invention provides a conveyor system having a frame, a plurality of rollers attached to the frame and a conveyor belt supported by the rollers, the conveyor belt having material-carrying outer face and a roller-contacting inner face. An input end of the conveyor system is preferably at a higher elevation than an output end of the conveyor system. One or more generators each having a drive shaft are operatively coupled to the conveyor system through coupling means, the coupling means are adapted to cause the drive shafts of the generators to turn when the conveyor belt moves, producing electrical power.

In one embodiment of the invention, the generator drive shafts are directly driven by drive rollers in frictional contact with the conveyor belt. In a preferred embodiment of the invention a single generator is coupled to several rollers which are each in frictional contact with a moving conveyor belt.

In a further embodiment of the invention, an electrical power transmission system is provided which comprises a combined material conveyor and electrical generator having an elongated conveyor belt having an input end and an output end, the conveyor belt supported along its length by a plurality of spaced apart transverse rollers. A power unit for driving said conveyor belt is provided. At least one electrical power generator is driven by motion of the conveyor belt, and electrical conductors extend from the power generator to a power outlet for providing electrical power to electrical devices external to the material conveyor.

BRIEF DESCRIPTION OF THE DRAWINGS

In drawings which illustrate embodiments of the invention.

DETAILED DESCRIPTION OF PREFERRED EMBODIMENTS OF THE INVENTION

Figure 1:
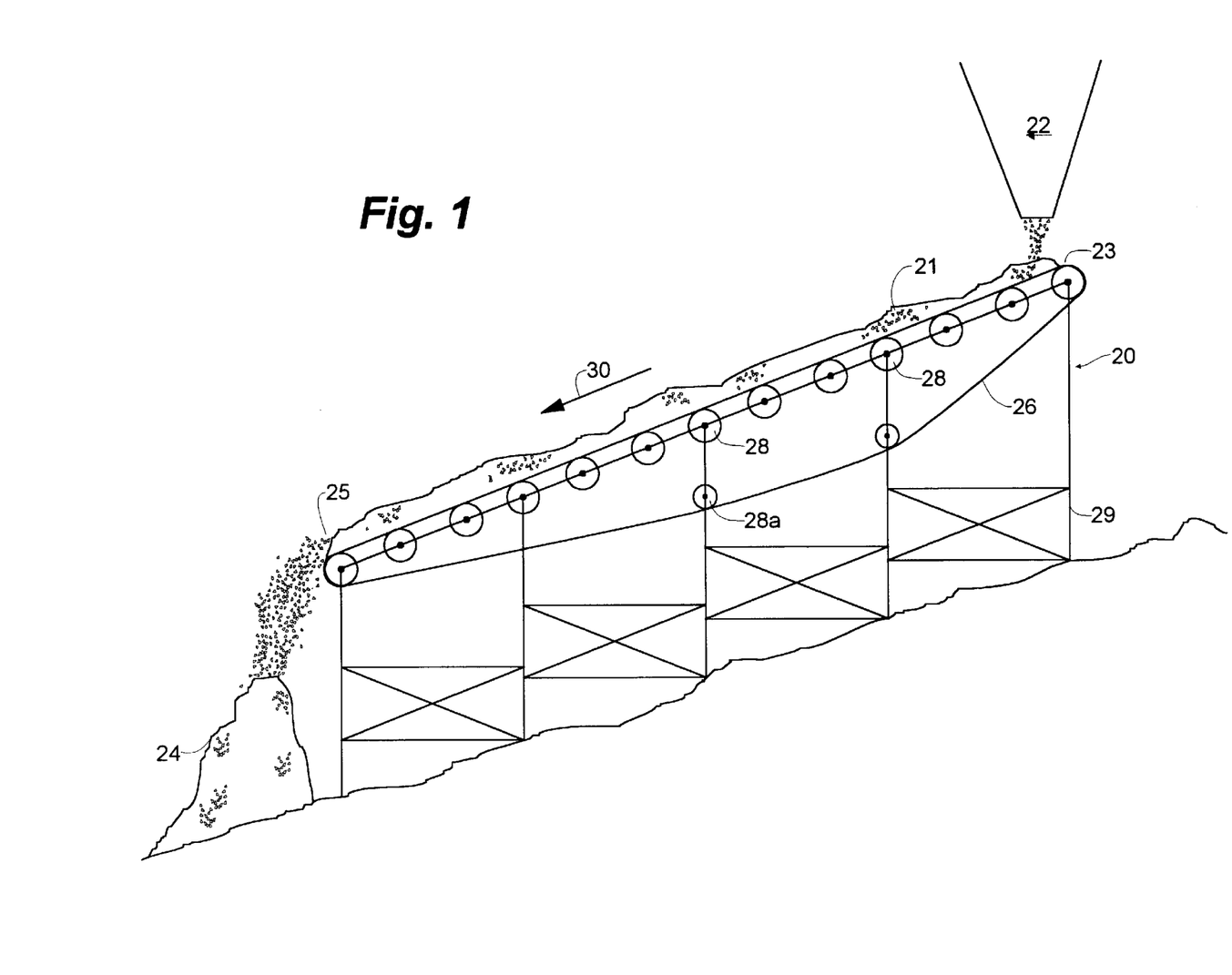
FIG. 1 is a side elevation of a prior art material conveyor system.

FIG. 1 shows a typical prior art material conveyor system 20. Such conveyor systems are used, for example, in mines to move large amounts of particulate material 21 from a hopper 22 at the start 23 of the conveyor system to a pile 24 below the end 25 of the conveyor system. Conveyor system 20 may be as much as several miles long and may comprise thousands of rollers 28 (for clarity only a few rollers 28 are shown in FIG. 1). Conveyor system 20 comprises an elongated conveyor belt 26 supported by a plurality of transverse rollers 28 which are mounted in a frame 29. Rollers 28 permit the upper surface of conveyor belt 26 to move in the direction indicated by arrow 30 so that material 21 is carried from hopper 22 to pile 24. Conveyor system 20 may be driven by a motor (not shown) coupled to one of rollers 28 or directly to the conveyor belt 26. However, where start 23 of conveyor system 20 is at a higher elevation than end 25, conveyor system 20 may be driven by gravity. Idler rollers 28a may be used to keep the non-load bearing portion of conveyor belt 26 aligned.

Where belt 26 slopes downwardly in the direction of arrow 30 then a component of the force of gravity which acts on each particle of material 21 on belt 26 is directed in the direction of arrow 30. This gravitational force can be great enough to drive the motion of conveyor belt 26. If the slope of belt 26 is steep and a large amount of material 21 is piled on belt 26 then the component of gravitational force acting along belt 26 can be far in excess of the force required to overcome frictional forces and drive belt 26 at a desired speed. In such cases brakes may be required to prevent belt 26 from running too quickly.

This invention can harness at least some of the energy which is wastefully dissipated in prior art material conveyor systems to produce useful electrical power. This energy comes from the change in gravitational potential energy of material 21 as it moves from start 23 to end 25 of conveyor 20. The change in gravitational potential energy as material 21 moves from start 23 to end 25 is given by the formula:

$$\Delta U = m \times g \times \Delta h$$

Where:

$\Delta U$ is the change in gravitational potential energy;

m is the mass of the mass of material 21 moved;

g is the acceleration of gravity (9.8 m/s$^2$); and $\Delta h$ is the difference in elevation between start 23 and end 25.

Figure 2:
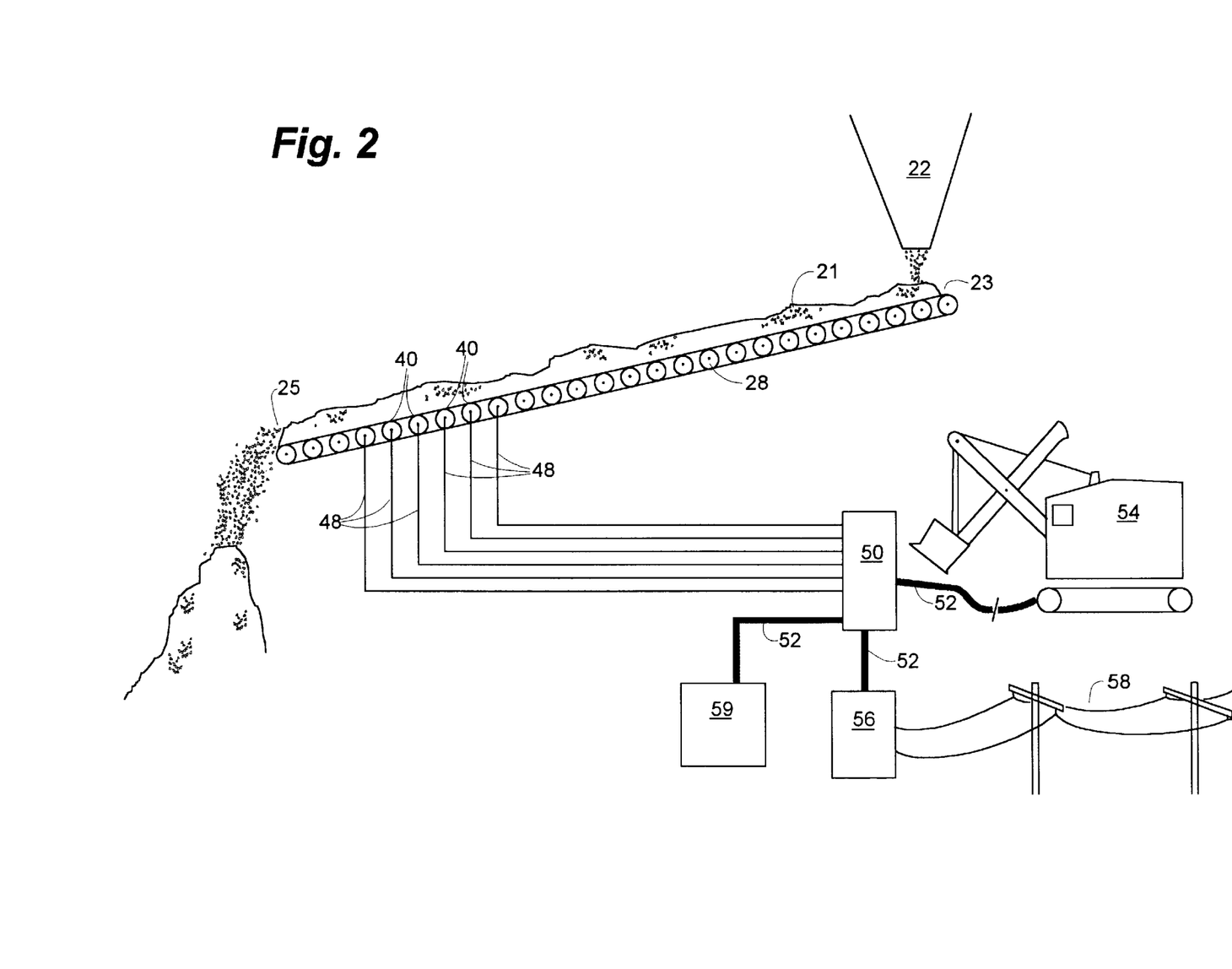
FIG. 2 is a perspective view of a portion of a conveyor system equipped with electrical generators according to one embodiment of the invention.

This invention harnesses some of the potential energy of material 21 by driving one, and preferably more, electrical generators 42 from the motion of belt 26. FIG. 2 shows a first embodiment of the invention in which a number of rollers 28 have been replaced with rollers 40 which have built in generators 42. It can be appreciated that each of rollers 40 provides some braking to belt 26 because of the torque required to turn generators 42. Where there are a large number of rollers 40 the braking force is distributed along belt 26 and can be regulated, if necessary, by adjusting the electrical load on generators 42.

Figure 3:
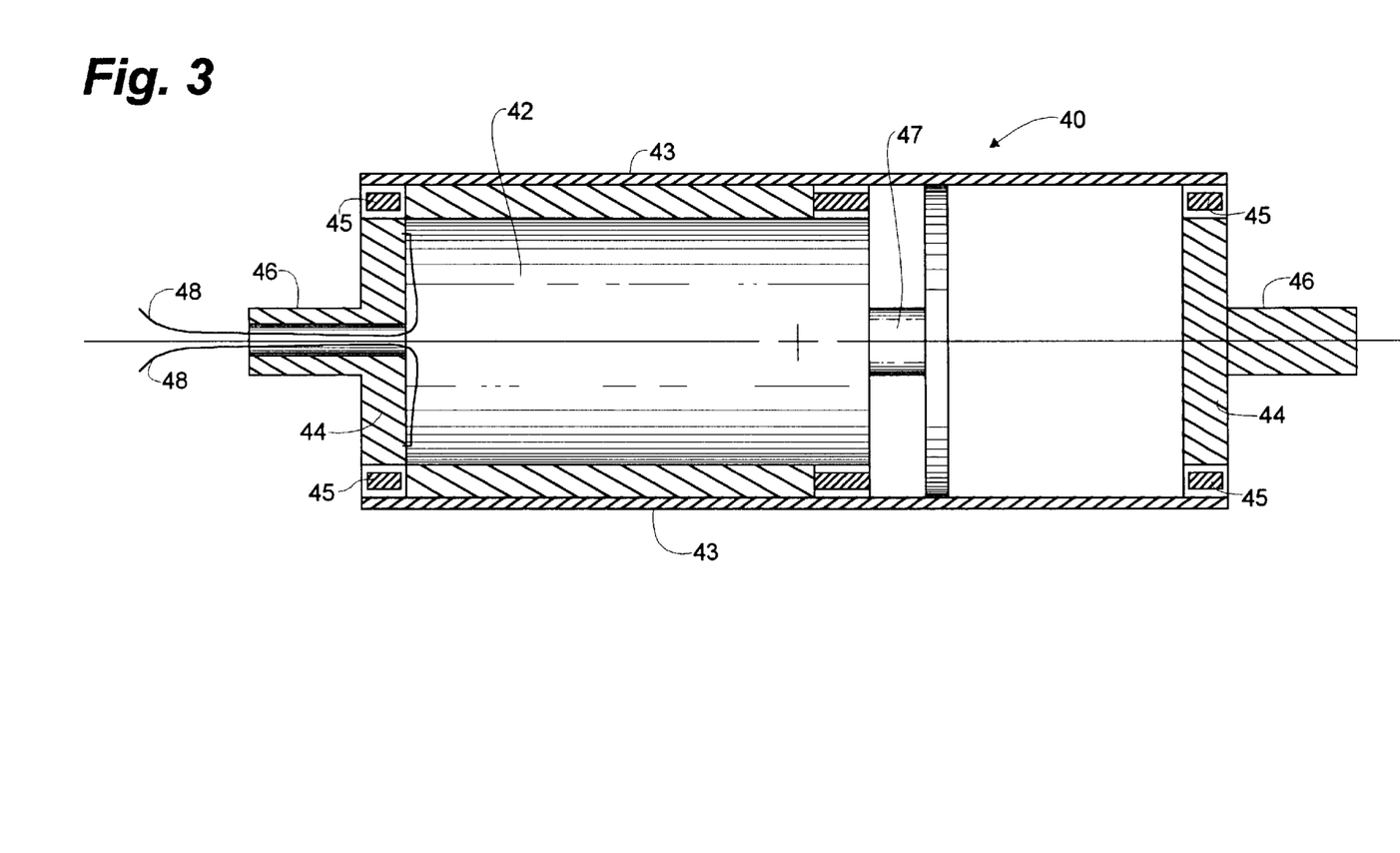
FIG. 3 is a section through a roller equipped with an internal generator.

FIG. 3 is a section through a roller 40 showing generator 42. As shown in FIG. 3, roller 40 has a generally cylindrical outer shell 43 mounted to a pair of end caps 44 by suitable bearings 45. Shafts 46 are provided for mounting rollers 40. Generator 42 is mounted to one of end caps 44 inside roller 40. Input shaft 47 of generator 42 is mounted to a member attached to outer shell 43. The rotation of outer shell 43 causes input shaft 47 to turn relative to generator 42 thereby causing generator 42 to generate electrical power. Power leads 48 extend out of roller 40 through end cap 44. Power leads 48 may be safely routed inside the frame of the conveyor system where they are protected from harm. Roller 40 may also have "twinned" internal generators, one mounted to each of end caps 44.

Where there is more than one electrical generator 42, the electrical power from the generators is preferably combined by a suitable combining circuit 50 into one or more power outlets 52, each capable of providing more electrical power than a single one of generators 42 can provide. Electrical power from an outlet 52 may be used to power any electrically operated apparatus, for example, an electrically operated power shovel 54 or electric lighting circuits (not shown). Generators 42 may generate direct current or alternating current. Preferably at least one outlet 52 provides standard alternating current, such as 240 Volts alternating at 60 Hz.

Electrical power from power outlet 52 may be direct current or alternating current. Known systems such as power inverters, motor-generators or the like may be integrated with combining circuit 50 or with generators 42 to convert direct current to alternating current and vice-versa, if desired. Electrical power from power outlet 52 may be fed into a utility power grid 58 after passing through a suitable power conditioner 56. Electrical power generated by generators 42 may be stored for later use in an energy storage device such as a battery system 59 comprising a battery charger and a bank of batteries.

Figure 4:
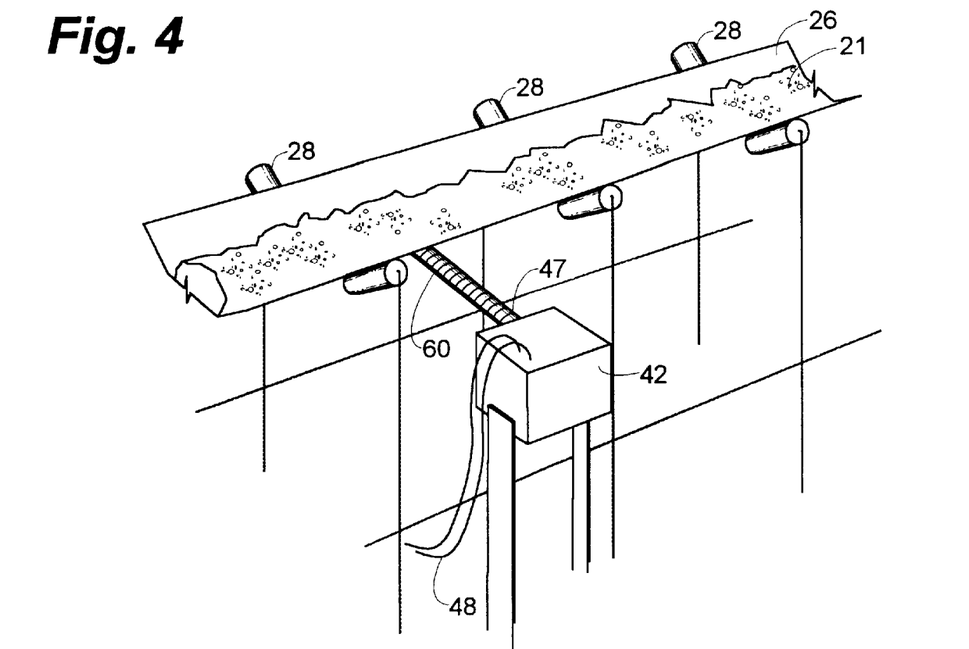
FIG. 4 is a perspective view of a portion of a conveyor system equipped with an electrical generator driven by a horizontal roller.

There are many alternative ways within the broad scope of the invention to drive generators from a conveyor belt 26 in a material conveyor. For example, as shown in FIG. 4, each of generators 42 may be driven by a roller 60 attached to drive shaft 47. Roller 60 is in frictional contact with a lower surface of conveyor belt 26. Roller 60 may be knurled or otherwise roughened to enhance the friction between conveyor belt 26 and roller 60. Preferably roller 60 takes the place of a roller 28 (i.e. it helps to support conveyor belt 26). Most preferably roller 60 is supported by bearings on either side of its portion which bears against the underside of conveyor belt 26. While it is not preferred, in the alternative, roller 60 may be in rolling contact with an edge of the upper surface of conveyor belt 26.

Figure 5:
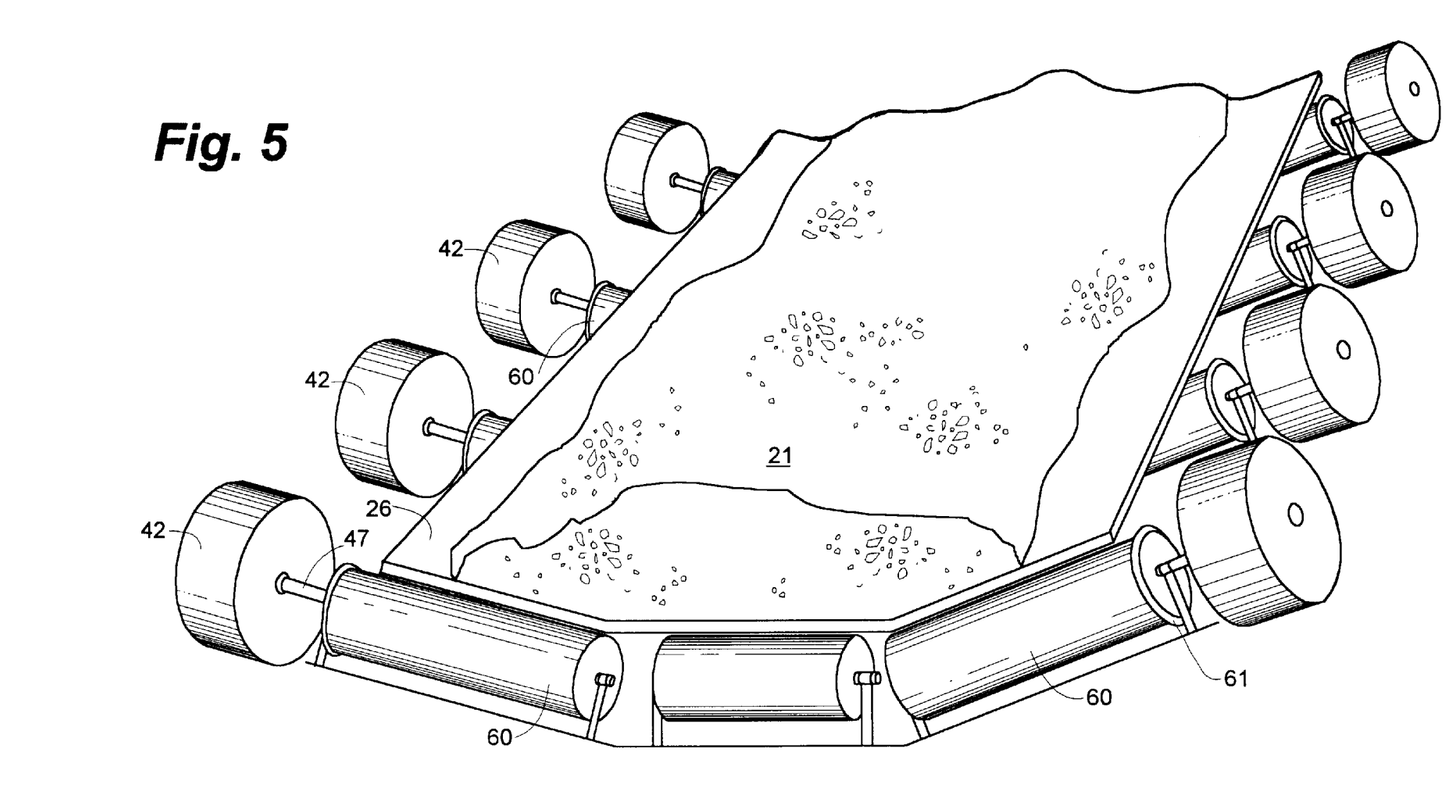
FIG. 5 is a transverse section through an alternative conveyor system equipped with generators according to the invention.

FIG. 5 shows an alternative conveyor system in which generators 42 have drive shafts 47 connected to rollers 60 which support inclined side portions of a conveyor belt 26. If necessary, rollers 60 may have flanges 61 to constrain lateral motion of belt 26.

Figure 6:
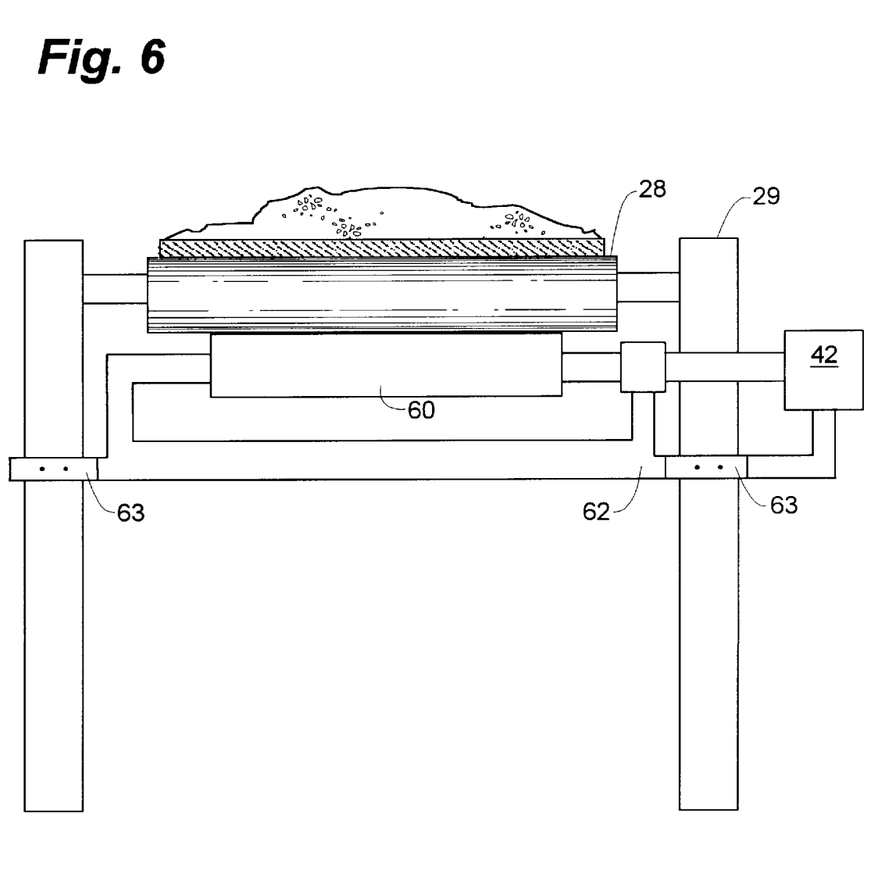
FIG. 6 is a transverse section view of a conveyor system retrofitted with a combined roller and generator according to the invention.

As shown in FIG. 6, an existing conveyor system having existing rollers 28 may be retrofitted with a combined roller 60 and generator 42 of the invention. In this embodiment, roller 60 may be in frictional contact with either the underside of conveyor belt 26 or, as shown in FIG. 6, in frictional contact with an existing roller 28. The roller 60 and generator 42 have their own frame 62 which may be mounted onto conveyor system frame 29 by mounting brackets 63.

Figure 7:
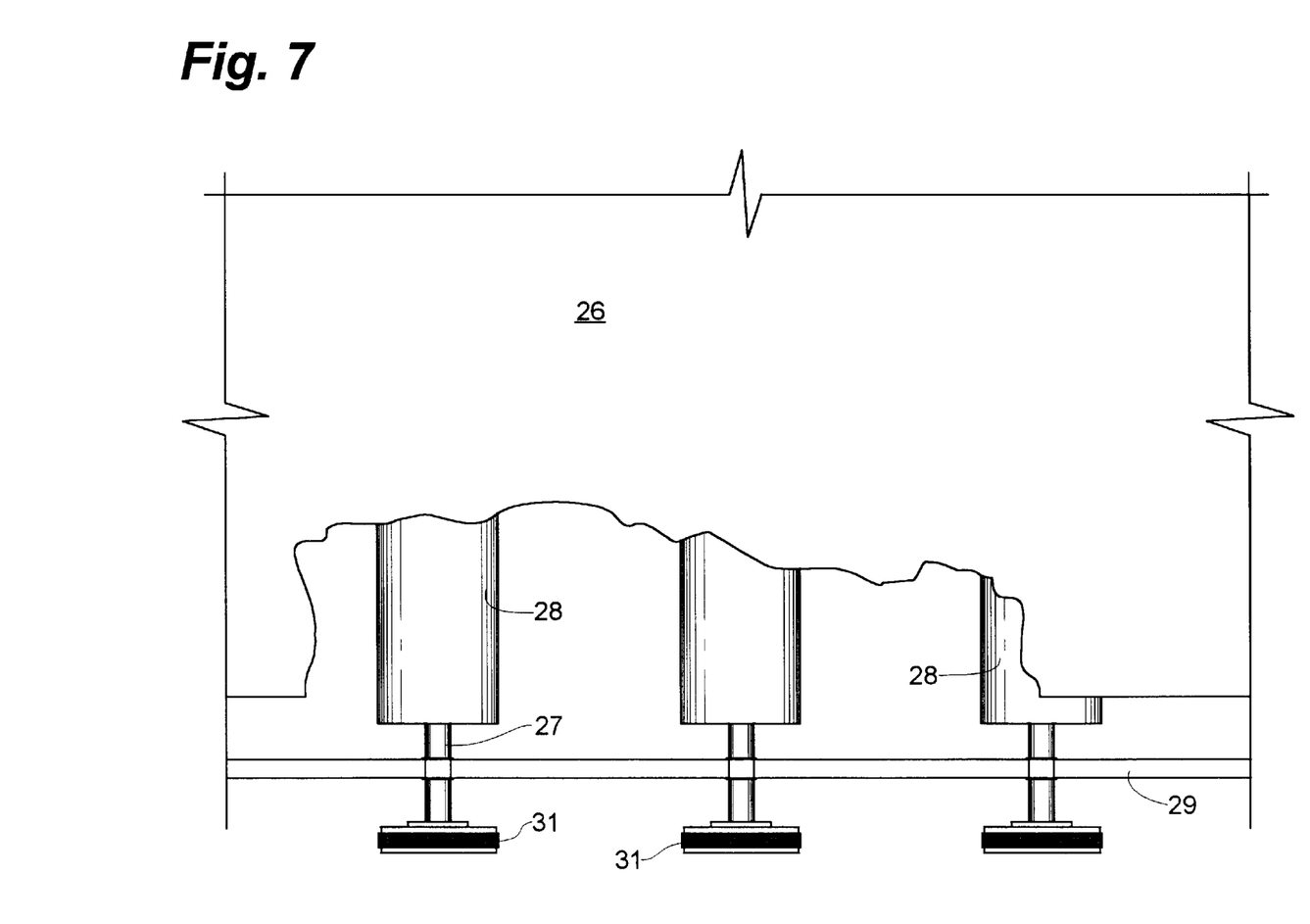
FIG. 7 is a fragmentary top view of a portion of a conveyor system having rollers with extended shafts.

Alternatively, as shown in FIG. 7, rollers 28 of the type used in existing material conveyors may have, or may be modified to provide, a shaft 27 which projects outwardly and rotates with roller 28. The projecting shaft can be coupled to drive shaft 47 of a generator 42 in many known ways. For example, a system of belts 31, spur gears, planetary gears, cogs and chains, or other known mechanical couplings may be used to connect a rotating projecting shaft to the input shaft 47 of a generator 42. The speed of rotation of the shafts may be stepped up or stepped down by a suitable known mechanical transmission to match the optimum rotational speed of input shaft 47 of generator 42. An existing material conveyor may be retrofitted with generators 42 to provide electrical power according to the invention. The best way to do this depends upon the construction of the particular material conveyor at issue.

Figure 8:
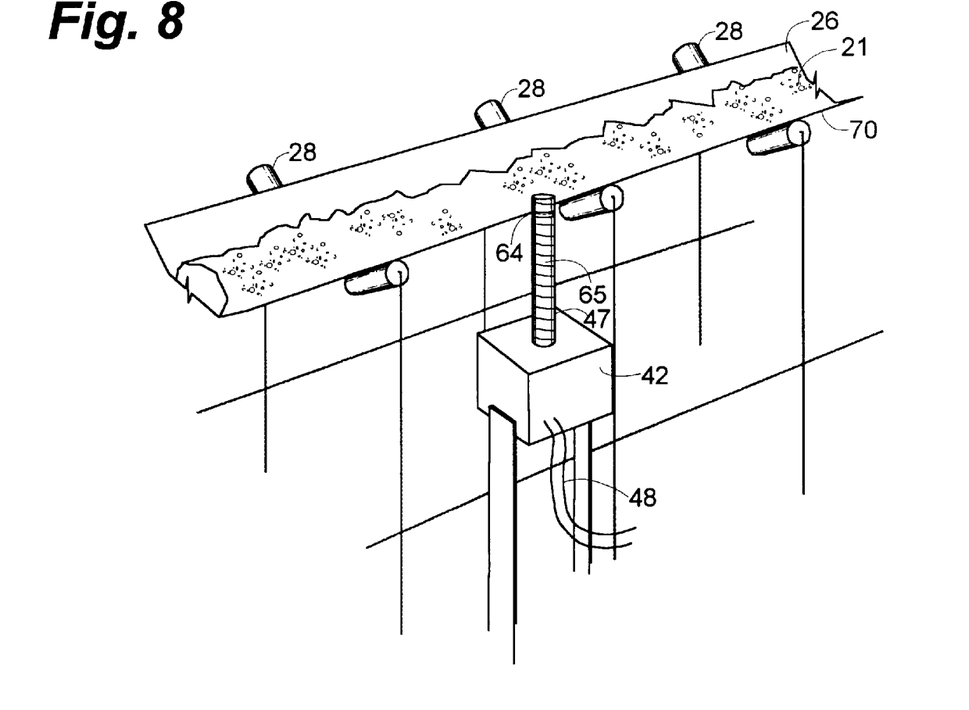
FIG. 8 is a perspective view of a conveyor system equipped with a generator driven by generally vertical shaft engaged with an edge of a conveyor belt.

As shown in FIG. 8, generators 42 may be driven by rollers 65 in rolling contact with a reinforced side edge 70 of conveyor belt 26. Optionally, but not preferably, roller 65 may be toothed and side edge 70 may have teeth that engage the teeth of roller 65. Rollers 65 may have a circumferential indentation 64 to receive and guide side edge 70 of conveyor belt 26.

Figure 9:
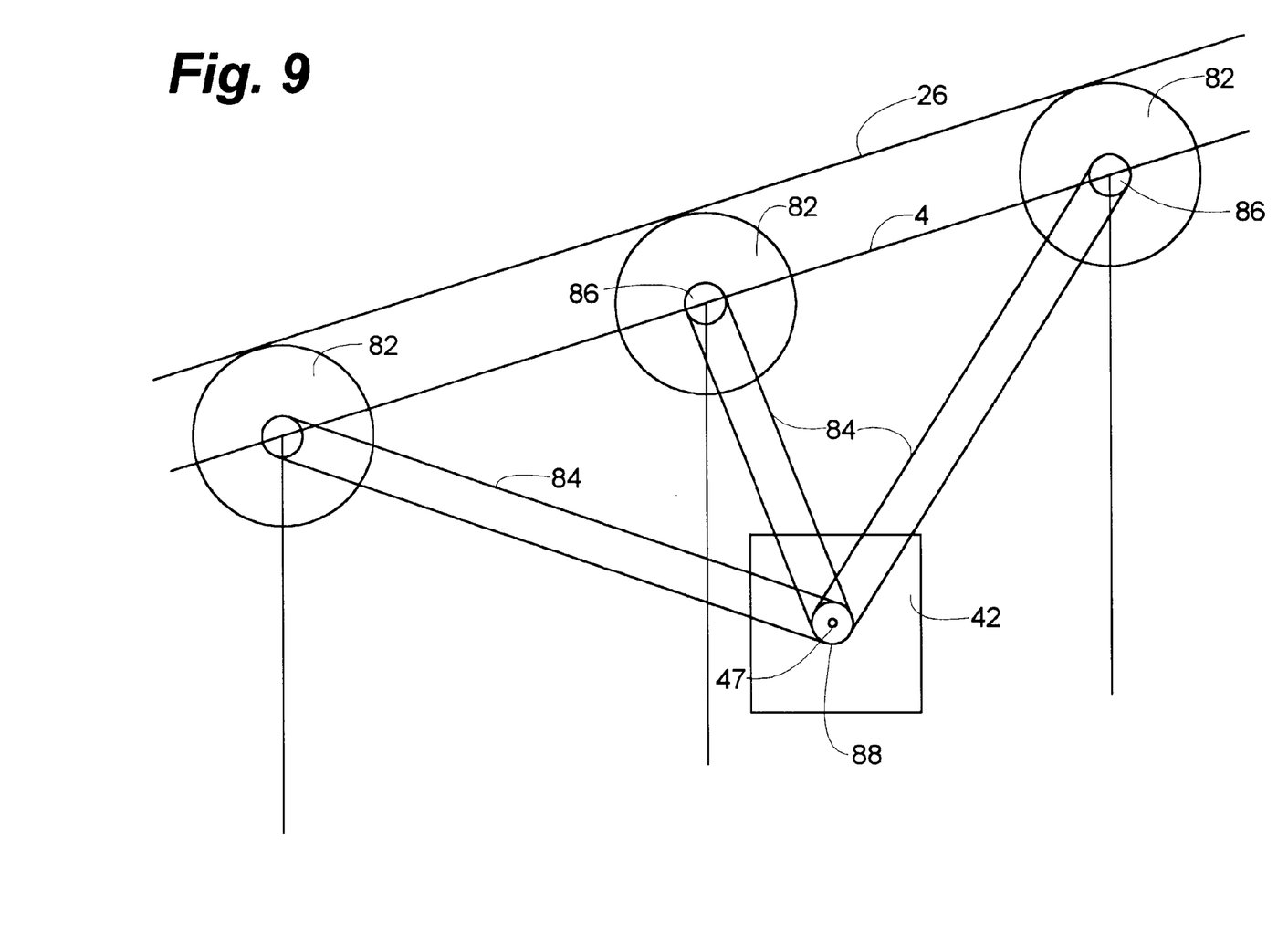
FIG. 9 is a side elevation of a portion of a material conveyor having an electrical generator coupled to several rollers by a plurality of drive belts.
Figure 10:
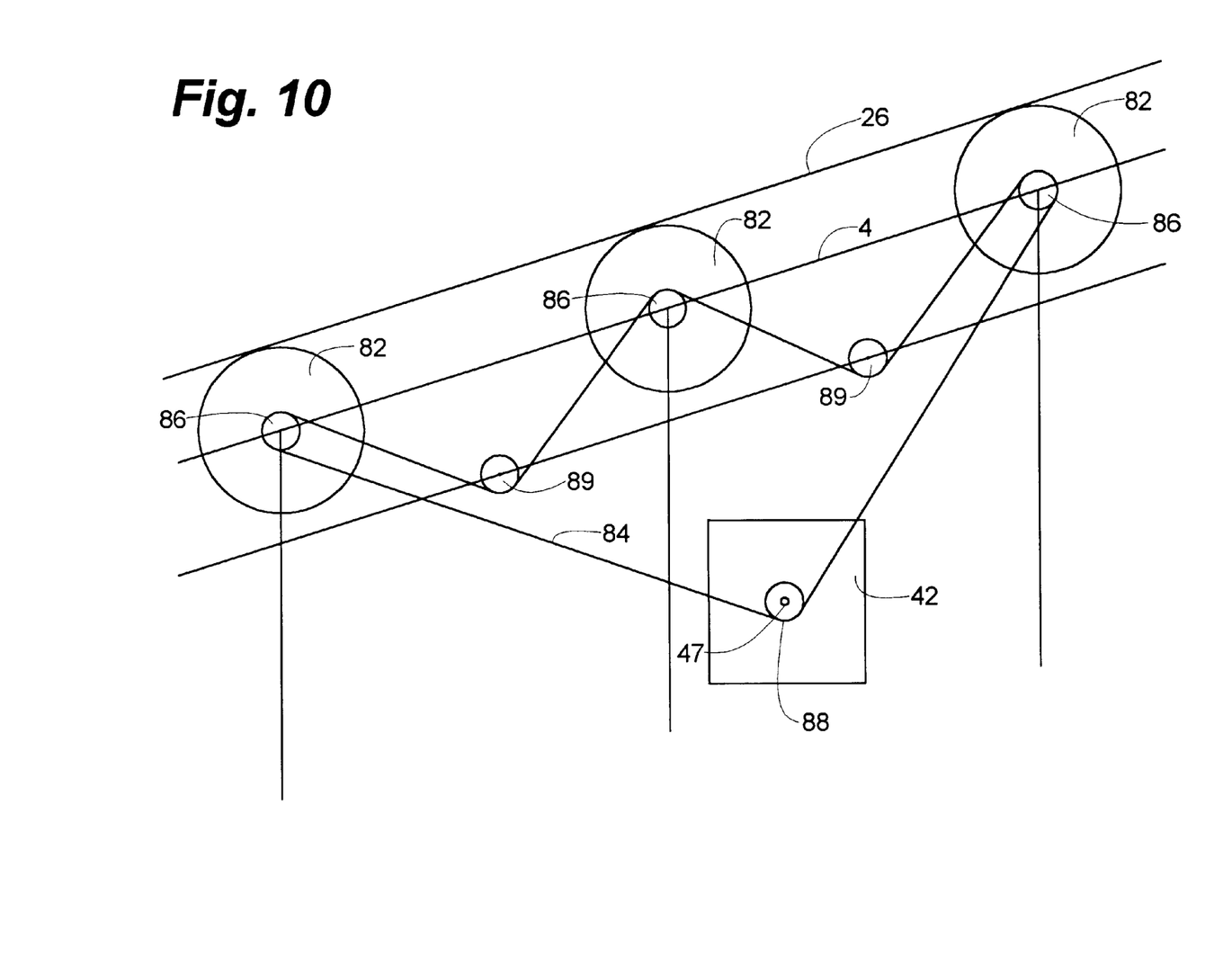
FIG. 10 is a side elevation of a portion of a material conveyor having an electrical generator coupled to several rollers by a single drive belt.

As generators may be expensive it can be desirable to drive a single larger generator by providing a mechanical linkage between the generator and a plurality of rollers. FIGS. 9 and 10 show two possible mechanical linkages for driving a generator 42 from the rotation of a plurality of rollers 82 in contact with a conveyor belt 26. The embodiment of FIG. 9, has a plurality of drive belts (or drive chains) 84 each one of which extends between a pulley (or sprocket) 86 on the shaft of one roller 82 and a pulley (or sprocket) 88 on the input shaft 47 of generator 42. This arrangement spreads the load presented by generator 42 over several rollers 82. Further, if one drive belt 84 breaks, generator 42 will continue to be driven by other drive belts 84 and the generation of electrical power will not be interrupted.

Alternatively, as shown in FIG. 10, generator drive shaft 47 of generator 42 may be driven by a single drive belt (or chain) 84 which engages pulleys (or sprockets) 86 on shafts which rotate with a plurality of rollers 82. Idler pulleys (or sprockets) 89 may be provided to tension and guide drive belt 84. In the embodiments shown in FIGS. 9 and 10 the outputs of two or more generators may be combined as described above with reference to FIG. 2.

While the invention has been described so far with respect to conveyor systems having an input end higher than an output end this is not necessary. The invention may be used for generating electrical power from energy which would otherwise be wasted in any downward sloping portion of a conveyor system where braking would normally be required. The invention may also be used regardless of the slope of the conveyor system to provide electrical power in a remote area through which a conveyor system passes. In such cases the conveyor belt acts to transmit energy from the power unit, such as a motor or engine that drives the conveyor, to the portion of the conveyor in which electrical energy is generated, obviating the need for an alternative power transmission system. As the conveyor system may extend for many miles this can represent a significant saving.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A combined material conveyor and electrical generator comprising:
    a) an elongated conveyor belt having an input end and an output end, said input end at a higher elevation than said output end and said conveyor belt supported along its length by a plurality of spaced apart transverse rollers;
    b) at least one electrical power generator for producing electrical power, each generator having an electrical power output and driven by motion of said conveyor belt;
    c) electrical conductors extending from each of said generators for electrically connecting said electrical power outputs to a power outlet for providing electrical power to electrical devices external to said material conveyor;
    d) a plurality of drive rollers in frictional rolling engagement with a surface of said conveyor belt wherein each of said generators has a drive shaft coupled for rotation with one or more of said drive rollers; and
    e) said generators being mounted inside said drive rollers and said drive rollers comprise a stationary end cap and a rotatable generally cylindrical shell mounted to said stationary end cap, wherein said electrical conductors for carrying electrical current generated by each of said generators extends through said stationary end cap.

2. The combined material conveyor and electrical generator of claim 1 wherein said power outlet being capable of providing more electrical power than the electrical power produced by any one of said generators.

3. The combined material conveyor and electrical generator of claim 1 wherein said drive rollers are generally vertical and are in rolling contact with a reinforced side edge of said conveyor belt.

4. The combined material conveyor and electrical generator of claim 3 wherein said drive rollers comprise a circumferential indentation and said reinforced edge of said conveyor belt is engaged with said drive roller in said indentation.

5. A combined material conveyor and electrical generator comprising:
    a) an elongated conveyor belt having an input end and an output end, said input end at a higher elevation than said output end and said conveyor belt supported along its length by a plurality of spaced apart transverse rollers;
    b) at least one electrical power generator for producing electrical power, each generator having an electrical power output and driven by motion of said conveyor belt;
    c) electrical conductors extending from each of said generators for electrically connecting said electrical power outputs to a power outlet for providing electrical power to electrical devices external to said material conveyor and said power outlet being capable of providing more electrical power than the electrical power produced by any one of said generators;
    d) a plurality of drive rollers in frictional rolling engagement with a surface of said conveyor belt wherein each of said generators has a drive shaft coupled for rotation with one or more of said drive rollers; and
    e) said drive rollers underlie and support said conveyor belt and comprise outwardly extending shafts which turn with said drive rollers and said drive shafts of said generators are coupled by mechanical couplings to said outwardly extending shafts and turn as said outwardly extending shafts turn, and each of said drive rollers comprises a flange outwardly adjacent an edge of said conveyor belt for maintaining alignment of said conveyor belt with said rollers.

\* \* \* \* \*